United States Patent [19]

Hennion

[11] 3,963,895
[45] June 15, 1976

[54] DEVICE FOR EFFECTING THE GUIDING AND OSCILLATION MOVEMENTS OF A WELDING HEAD EQUIPPED WITH AN ELECTRODE-CARRIER NOZZLE

[75] Inventor: Jean Maurice Hennion, Saint-Nazaire, France

[73] Assignee: Fives-Cail Babcock S.A., Paris, France

[22] Filed: Dec. 18, 1973

[21] Appl. No.: 425,846

[30] Foreign Application Priority Data
Dec. 21, 1972 France .................. 72.45579

[52] U.S. Cl. ..................... 219/125 R; 219/124; 219/125 PL; 219/136
[51] Int. Cl.² ........................................... B23K 9/12
[58] Field of Search .......... 219/124, 125 R, 125 PL, 219/126, 136

[56] References Cited
UNITED STATES PATENTS

| | | | |
|---|---|---|---|
| 2,289,938 | 7/1942 | Smith | 219/136 |
| 2,900,489 | 8/1959 | Keener | 219/136 |
| 3,328,556 | 6/1967 | Nelson et al. | 219/125 R X |
| 3,527,918 | 9/1970 | Fielder et al. | 219/125 R |
| 3,555,239 | 1/1971 | Kerth | 219/125 R |
| 3,710,068 | 1/1973 | Calton et al. | 219/126 X |
| 3,844,469 | 10/1974 | Westfall | 219/125 R X |

Primary Examiner—J. V. Truhe
Assistant Examiner—N. D. Herkamp
Attorney, Agent, or Firm—Hopgood, Calimafde, Kalil Blaustein & Lieberman

[57] ABSTRACT

The invention relates to a device for effecting the guiding and oscillation movements of a machine part, especially a welding head of the type mounted for oscillating motion either by a movement of translation or by a pendular movement in a certain direction under the action of an impulse-control system, the movements of the said machine part being limited by direct mechanical contact of said part at predetermined points, the duration of each period of travel of the part being equal to a selectively-determined fraction of the interval between two successive impulses from the said control system, the remaining fraction constituting a stopping time between two periods of travel of said machine part.

The machine part is actuated by a driving fluid and distributor system and further comprises means for regulating the speed of the said part in its outward and return travel periods by acting on the flow-rate of the driving fluid.

The principal application is concerned with the welding together of metal plates.

29 Claims, 12 Drawing Figures

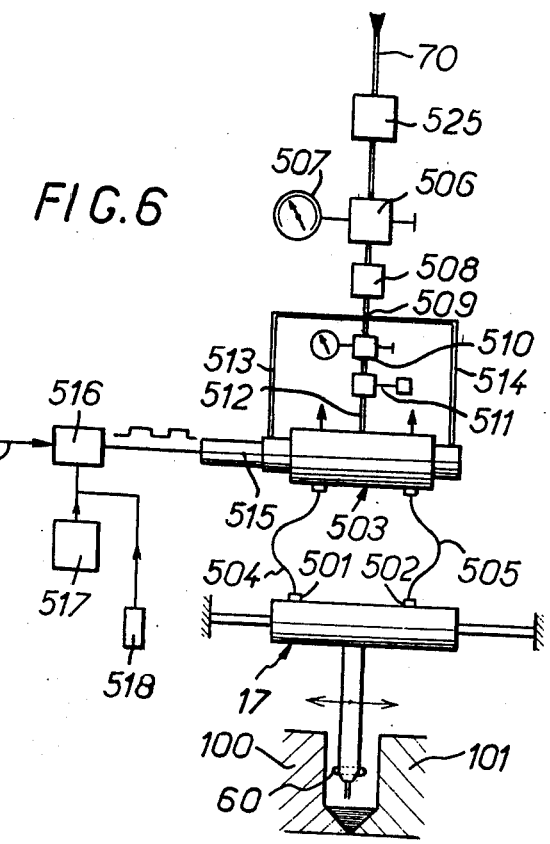
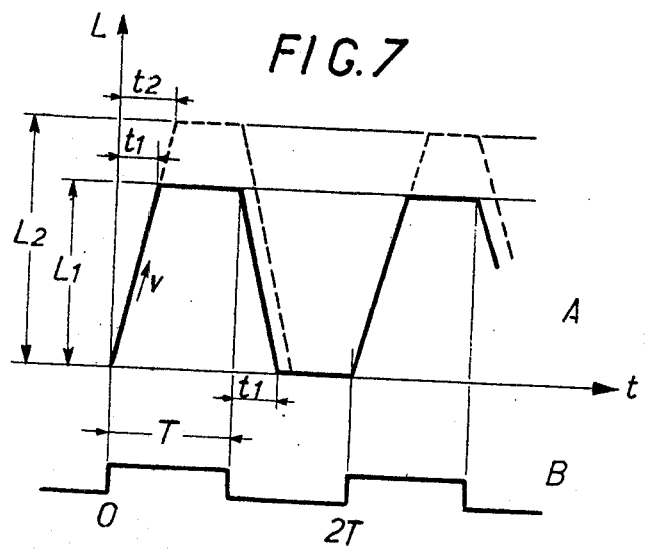

DEVICE FOR EFFECTING THE GUIDING AND OSCILLATION MOVEMENTS OF A WELDING HEAD EQUIPPED WITH AN ELECTRODE-CARRIER NOZZLE

The present invention relates to a device for guiding and oscillating a part of a machine, in particular a welding head, and also to an electrode-carrier nozzle with which this head is equipped. Since the electrode is a consumable tool element, the welding head in general will sometimes be referred to as tool-holding apparatus, and the oscillated portion thereof which directly carries and thus positions the electrode will sometimes be referred to as a tool-supporting element.

Devices exist which permit the guiding of welding torches or other machining elements along joints, rails or slides, and which are also adapted to control the movements of oscillation of this part of the machine. In these known devices, it is generally a feeler or probe which is displaced in the course of a working stroke and is relied upon to position the movable element through the intermediatry of electronic, mechanical or mixed controls.

In the particular case of welding, the complexity of the controls, allied with a certain fragility and a utilization frequently limited to well-defined work, constitute the drawbacks of such devices.

Following a first aspect, the invention proposes to provide improved tool-holding apparatus in the form of a guiding and oscillation welding head in a simple, robust and reliable form, eliminating the use of a feeler while retaining the possibilities of reaction especially sensitive to pressure.

To this end, according to the invention, the guiding and oscillation tool-supporting element of a welding head, of the type mounted with an oscillating movement either by a rectilinear translation motion or by a pendular motion, along a direction under the action of an impulse control, is characterized in that the displacements of the tool-supporting element are limited by direct mechanical contact of the electrode to be regulated at pre-set points, and in that the duration of each travel is equal to a selectively predetermined fraction of the interval between two impulses, the remaining fraction constituting a stopping time between two travels of the said part.

The device of the invention comprising a control of the said part by fluid, preferably comprises means for regulating the speed of the said part in its outward and return travels. These regulating means advantageously, act on the flow-rate of the driving fluid.

This arrangement offers the advantage of eliminating the feeler element and of limiting the travel of the moving part directly by pre-regulated abutment or surface stops. The impulse control defines the frequency of the oscillating movement while the regulating means acting on the flow-rate of the driving fluid permit the selective determination of the duration of the working travel and therefore of the stopping time between two consecutive travels. The invention provides regulating means for the frequency of the control impulses which are known per se.

In accordance with one of its characteristic features, the device according to the invention, comprising a fluid control of the said part, comprises means responsive to an increase in the fluid pressure following an end of travel by mechanical contact and starting a reversed travel through the intermediary of time-controlled actuating means, whereby the said stopping time is adjustable by the said time-controlled actuating means independently of the duration of a travel of the said part.

In this alternative form of construction, the regulation of the two parameters: duration of a travel and the stopping time between travels, may be effected in an independent manner. In fact, it is the increase in pressure of the driving fluid in response to the coming into abutment with the moving part by mechanical contact, which releases the reversal of the transverse movement through the intermediary of a time-delay control, of the pneumatic type, for example.

These operating means are advantageously pneumatic relays for example, acting independently at the end of the outward and return travels. This makes it possible to have different stopping times at the ends of each travel, this possibility being combined or not with a regulation of the sensitivity of the means responsive to the increase in pressure (or flow-rate) of the driving fluid.

According to still a further characteristic, the device comprises blocking means intended to hold the said element immobilized in one of its positions of mechanical contact.

These means come into action at the level of the distribution of the driving fluid, either for blocking the moving part in a given position on the course of the travel, or again in order to cause an instantaneous change-over from one extreme position to another.

In one of its aspects, the device relates to the equipment of a welding head comprising an electrode-carrier nozzle associated with a longitudinally movable trolley and capable of carrying out transverse oscillations, the said head being characterized in that the said oscillations are controlled by a device according to the invention.

In an application of such a welding head to the production of a welding joint, especially by filling between two opposite faces of parts to be welded, with the said electrode-carrier nozzle mounted so as to move longitudinally and vertically between the said parts along the said faces or along a guiding rail, the ends of travel of the transverse oscillating movements of the said nozzle are effected by mechanical contact with the said faces or the said rail.

According to a further application of a welding head of this kind, two devices of the invention act conjointly in two directions in such manner as to cause the moving part to carry out pre-regulated movements within a space limited by four surfaces substantially parallel in pairs and orientated in the above-mentioned directions. The said directions may in particular be orthogonal.

In another aspect, the invention relates to a welding head comprising an electrode-carrier nozzle with at least one welding electrode wire with continuous feed, and characterized in that the said mechanical contact is effected through the intermediary of an interchangeable stop roller, rotatably mounted about an axis substantially parallel to the axis of the said electrode wire, housed in the immediate vicinity of the lower extremity of the said electrode-carrier nozzle, this roller having a diameter which determines, when it is in the abutment position against one of the edges of the part to be welded or against the said guiding rail, the distance from the wire electrode to one of these faces or to this rail.

The said electrode-carrier nozzle is advantageously constituted by a support orientatable about a substantially vertical shaft adapted to receive a first arm and a second arm at its lower position, extending substantially vertically at a distance apart such that they provide between them a passage for the said vertical wire electrode, the said second arm, adapted to be coupled to the welding-current source, having at its free lower extremity feeding means for said electrode wire with welding current, while the said first arm, insulated from the welding current, comprises at its lower free extremity, on the one hand the said interchangeable stop roller, and on the other hand means for simultaneously guiding the said electrode wire and its clamping against the said current supply means.

According to a characteristic feature of this aspect of the invention, the said supply means are constituted by a contact member of any appropriate conducting material such as a hard alloy for example, the said member comprising a vertical groove providing a partial housing for the said electrode wire and assembled on the said second arm by any appropriate method, brazing for example.

Furthermore, the said guiding and clamping means arranged above the said stop roller facing the supply means of the said second arm, are constituted by a friction device composed of a casing adapted to slide in a slot formed for that purpose in the first arm, and containing a shoe of insulating material, ceramic for example, the said casing being subjected to the effect of elastic means, so that the said shoe applies the electrode wire against the said supply means.

According to an alternative form of the invention, the nozzle comprises two substantially parallel electrode wires, the axes of which are in the plane common to the said first and second arms, the said second arm comprising, facing the friction device of the said first arm, an intermediate conductive contact member articulated at its upper part about a horizontal axis and having two vertical guiding grooves providing a partial housing for the two said electrode wires.

According to another feature of the invention, the said first and second arms have the form of substantially vertical thin blades, the height of which can be adapted to the depth of the welding chamfer, and the width of which extends parallel to the oppositely-facing edges of the parts to be welded.

These arrangements make it possible to work between parts having thicknesses which vary from 15 to more than 500 mm., by modifying the length of the two arms or thin blades which guide and supply the electrode, the minimum space between the parallel edges of the members to be welded being in the vicinity of 10 mm., but this can be still further reduced by means of blades of very small thickness.

The device can be adapted both to deep chamfers with straight and substantially parallel edges and also to those having varied profiles. To this end, according to a further characteristic feature of the invention, safety and indicating means are provided intended for re-centering the axis of the trajectory of the electrode-carrier nozzle with respect to the axis of the welding joint, said means being actuated as soon as a pre-determined distance between the axis of the said nozzle trajectory and that of the said joint is exceeded, the device being thus adapted to welds in chamfers the edges of which have varied profiles.

The said safety and indicating means are preferably constituted, on the one hand by micro-contacts actuated by pre-regulated abutments fixed on the electrode-carrier nozzle, and on the other hand, by light and sound signals operated in response to the actuation of the said microcontacts.

The characteristic features and advantages of the invention will furthermore be brought out in the description which follows below, given by way of example, reference being made to the accompanying drawings, in which:

FIG. 6 is a synoptic diagram of one form of rectilinear oscillation device;

FIG. 7 shows at A the amplitude characteristic of travel/time of the head according to the form of embodiment of FIG. 5, and at B the curve of the control impulses;

FIG. 10 is a simplified view in front elevation of another alternative form, involving a pendular oscillation device a;

Figure 1:
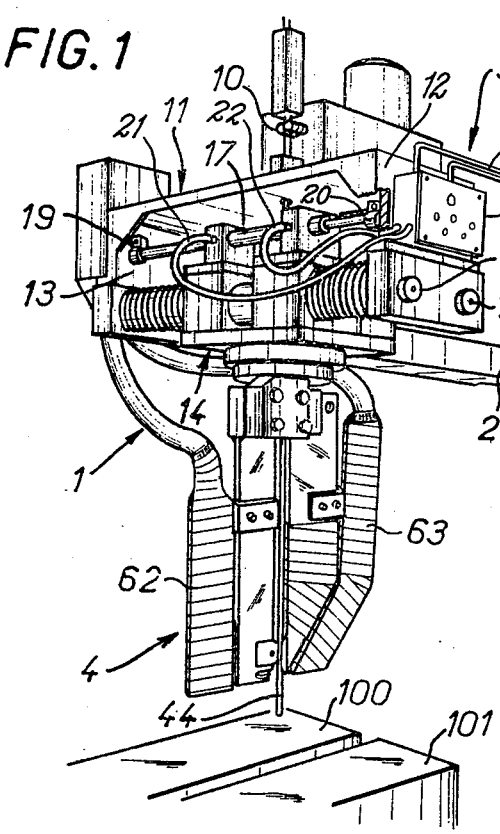
FIG. 1 is a general view in perspective of tool-holding apparatus in the form of a welding head fitted with guiding and oscillation tool-supporting structure which includes a electrode-carrier nozzle in accordance with the invention.
Figure 2:
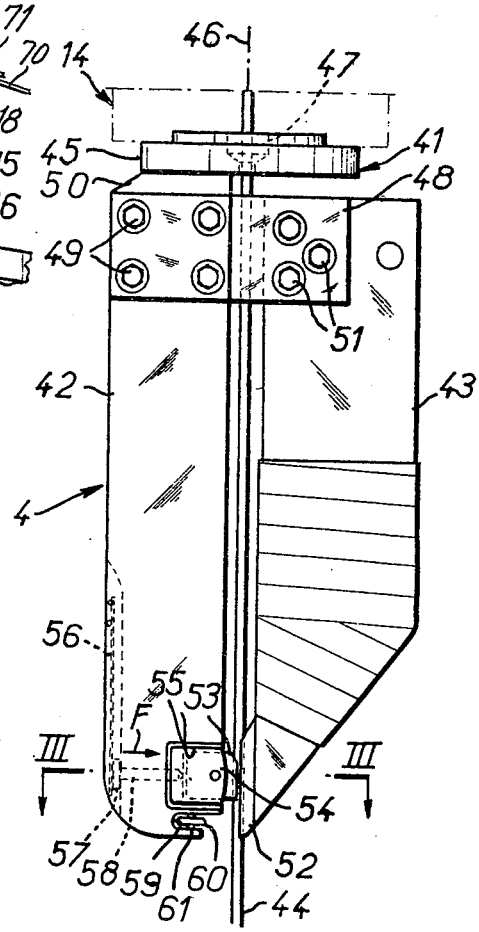
FIG. 2 is a view in elevation to a larger scale of the electrode-carrier nozzle alone.

Referring to FIG. 1, one form of tool-holding apparatus of the invention is illustrated by a welding head 1 mounted on the slide 2 of a welding machine (not shown further forward). The welding head 1 comprises on the one hand frame structure 3 (including guiding and oscillation control elements) and on the other hand tool-supporting means including an electrode-carrier nozzle 4. These two units will first of all be described separately.

Referring now to FIG. 1, it is found that the device 1 is constituted by a support or frame member 11 having the general shape of a U open towards the bottom. Between its cheeks 12, 13, this support 11 receives a trolley 14 slidably mounted on ball bearing slides 15, 16 and actuated by a double-acting jack 17 controlled by a pneumatic unit housed in a box 18. The movement of the trolley 14 is carried out along the horizontal in a direction substantially perpendicular to the axis of forward movement of the head on the slide 2. At the two extremities of the rod of the jack 17 against the cheeks 13, 14, are mounted micro-contacts 19, 20, only the first being visible in FIG. 1, which come into action when, for reasons which will be explained later, the travel of the trolley 14 exceeds a pre-determined value in either direction.

During normal operation, the travel of the trolley 14 is limited by direct mechanical contact against a face or a rail of a roller 60 forming part of the nozzle 4 and which will be described with this latter. The jack 17 is supplied from the box 18 through two flexible conduits 21, 22.

Referring now to FIGS. 6 and 7, the device controlling the oscillating movement and its operation will now be described. For a clear understanding of the description which follows, it is useful to specify that the welding head 1 with its nozzle 4 is assumed to work at the bottom of a channel, being a partly filled welding joint between members 100 and 101 of considerable thickness.

The double-acting jack 17 of FIG. 1 is supplied at its two extremities 501 and 502 by a distributor 503, to which it is connected by two flexible conduits 504 and 505. Compressed air from a supply conduit 70 enters the box 18 (FIG. 1) passing successively through a filter 525, a high-pressure reducing valve 506 with an indicating pressure-gauge 507, a greasing point 508, up to a four-way coupling 509; through a pressure-reducing device 510 and a flow regulator 511; a central line 512 from the coupling 509 supplies the distributor with compressed air ensuring the movement of the trolley 14 at a variable speed. The two lateral lines 513 and 514 co-operate with a valve 515 in piloting the slide-valve of the distributor 503. The valve 515 is electrically operated through an electrical supply box 516 by an impulse generator 517 of adjustable frequency, the electric supply line to box 516 (within box 18) being identified 71 in FIGS. 1, 6 and 8. A manual control 518 permits of direct action at the level of the casing 516 on the control of the valve 515.

The operation of the FIG. 6 form of the device according to the invention will be clear from FIG. 7. At the outset, the nozzle is assumed to be in one of its oscillation limit positions, defined by the mechanical contact of the roller 60 for examle against the wall of the member 100 (see FIG. 6).

At the instants $0, 2T \ldots 2nT$, the generator 517 emits control impulses having a duration T (curve B). During the period T of the impulse, the valve 515 is operated and acts on the piloting circuits of the slide-valve of the distributor 503 in such manner that the jack 17, supplied in a suitable way, causes a movement of the trolley 14 from the wall of the member 100 towards the opposite member 101.

Depending on the position of the flow-rate regulator 511, this travel $L_1$ is effected in a variable time, for example $t_1$ of the graph A of FIG. 7.

At the time $t_1$, the roller 60 comes into abutment against the wall of the member 101 and remains there until end of the time T, at this time; the valve 515 being no longer operated, the piloting circuit reverses the supply of the jack 17 which then effects the return travel. This travel, which starts at end of the time T, ends at the instant $T + t_1$, when the roller 60 comes into contact with the other wall of the channel (member reference 100), there to await the arrival of a fresh impulse cycle supplied by the generator 517.

Under these conditions, the waiting time or dwell at the positions of abutment of the transverse oscillating movement is equal to the difference $T - t_1$ between the duration of a half-cycle, or T, and that of a single transverse travel, or $t_1$.

If the travel has a different amplitude, for example $L_2$ which is greater, and since the flow-rate regulator 511 ensures an unvarying flow, the time of the movement increases to a value $t_2$. However, at end of the time T, the reversal of the direction of travel will take place as before, and the dwell time $T - t_2$ will have a smaller value.

The dwell time is therefore variable, depending upon the duration of the travel of the trolley, this duration being in turn dependent on the amplitude of this travel and the selected setting of the flow-regulator 511. The amplitude of the movement may of course be limited by other abutment means, acting for example at the level of the trolley.

Figure 8:
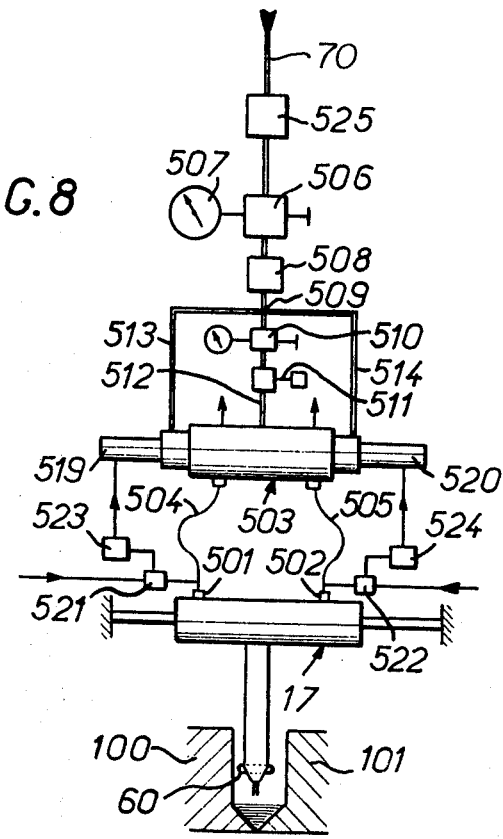
FIG. 8 is a synoptic diagram of an alternative form of rectilinear oscillation device.
Figure 9:
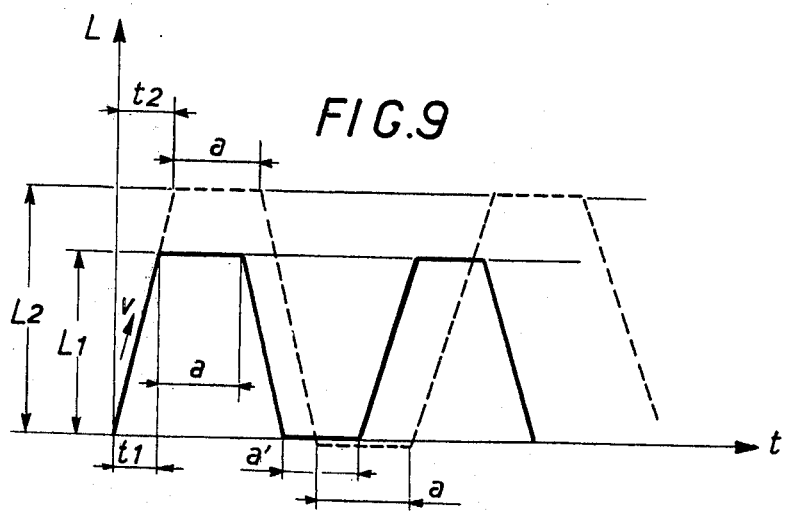
FIG. 9 shows the graphs of FIG. 7 referred to the alternative form of FIG. 8.

FIGS. 8 and 9 illustrate an alternative for controlling oscillating movement according to the invention. It will be seen from FIG. 8 that the driving fluid supply portion of the distributor 503 is unchanged (from FIG. 6), but that this latter (503) comprises two valves 519 and 520; fluid pressure of flow detectors 521, 522 branched in parallel with the inlet points 501 and 502 for conduits 504 and 505 on the jack 17 act on variable time-lay relays 523, 524 which in turn control the operation of the valves 519 and 520.

The graph of FIG. 9 illustrates operation of the form of FIG. 8. At the instant 0, the roller 60 is assumed to be in the position of abutment; and the slide-valve of the distributor ensures the supply of pressure fluid to one of the extremities of the jack 17.

During the time $t_1$, the trolley 14 carries out a travel of amplitude $L_1$. The coming into abutment results in an increase of pressure in the cylinder of the jack 17, and when this latter reaches a pre-set value, the corresponding detector 521 or 522 acts on the associated time-lag relay 523 or 524 which, at the end of the delay period acts on the corresponding valve and causes the displacement of the slide-valve of the distributor. At the time $t_1 + a$ (where $a$ is the time-lag of one of the relays), the return travel begins, and the ensuring dwell time $a'$ is a function of the setting of the time-lag relay actuated.

The dwell times $a$ and $a'$ may thus be equal to or different from each other, but they are in any case independent of the amplitude of the travel and of the selected setting of the flow-rate regulator 511.

It will be understood that for either of the two alternative forms shown in FIGS. 6 and 8, it is possible to eliminate one of the actions of the jack 17 (change from double-acting to single-acting) so that the roller 60 remains in pressure-loaded position-tracking abutment against a guiding rail or one of the two walls of the joint to be welded, and therefore at a constant distance from this rail or this wall. Furthermore, a manual device 518 controls the passage of the trolley and its nozzle at will from one end position to the other, for example in order to carry out an adjustment.

Figure 10:
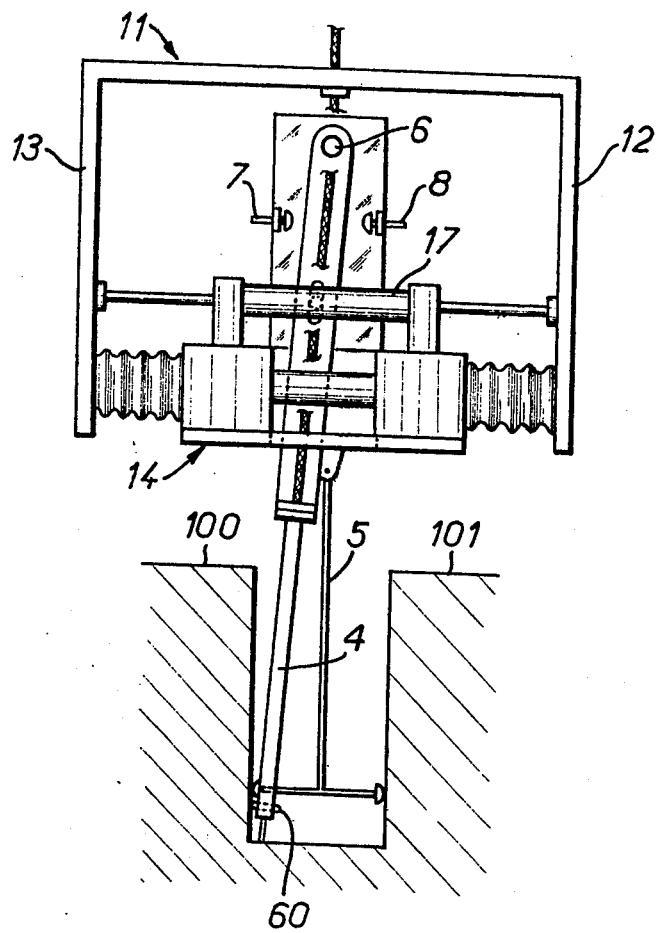

Another mechanical alternative of the device shown in FIG. 10 makes it possible to effect a pendular oscillation of the welding nozzle, as distinguished from the rectilinear oscillation already described in connection with FIGS. 1, 6 and 8 (wherein the nozzle always remains parallel to the opposed faces of the work pieces 100, 101), thus permitting use of the nozzle as a guide with a very small inclination of the nozzle.

The trolley 14, mounted as previously described, is held in its mean positon (with respect to the longitudinal axis of the surface to be swept) by a mechanical guide 5, the latter being supported against one of the vertical faces of the members 100, 101 defining the welding joint or (as shown) being automatically centered between the two opposite faces of this joint. The welding nozzle 4, shown diagrammatically, is articulated about a shaft 6. The jack 17 controlled in accordance with one of the alternative forms described above, produces pendular oscillation limited by the roller 60 or by the means 7, 8, micro-contacts for example.

Reference will now be made to FIGS. 2 to 5, which bring out the constructional details of the electrode-carrier nozzle associated with the upper guiding and oscillation device.

This nozzle 4 mainly comprises an orientatable support 41 and two arms 42 and 43 between which runs the electrode wire 44 delivered by a straightening and forward movement device 10 (FIG. 1) of a type known per se.

The support 41 has a tubular insulating portion 45 intended to be assembled on the trolley 14 and pivoting about a vertical shaft 46. The support comprises an insulating bushing 47 for the electrode 44. The arm 42 has the general appearance of a carpenter's square, in which the short wing 48 is assembled by bolts 49 on a plate 50 rigidly fixed on the support 41.

The support 41 and the arm 42 are electrically insulated with respect to the head of the machine.

At the extremity of the wing 48 of the arm 42 is added the arm 43, fixed by bolts 51. The welding current is brought in on this arm by clamping the thimble of a flexible cable (not shown). The whole of the support 41 and the arm 42 is insulated from the arm 43, that is to say from the welding current, by means of small insulating plates and rings.

At the free extremity of the arms 42 and 43, the electrode 44 is guided and supplied by passing between a contact member 52 fixed on the edge of the arm 43 and an insulating pressure shoe 53. The member 52 of conductive hard alloy is provided with a vertical groove which offers a partial housing for the electrode 44.

The shoe 53 is housed in a casing 54 (FIG. 3) adapted to slide in the slot 55 formed in the arm 2. A spring blade 56 housed in a vertical recess of the arm 42 is stressed in such manner as to act in the direction of the arrow F on the head 57 of a push-rod 58 in contact with the casing 54. The electrode 44 is thus applied against the current lead-in member 52 and is guided between this member and the shoe 53 during its forward movement.

In the immediate vicinity of its lower extremity, the arm 42 is provided with a housing 59 receiving a roller 60, of hard steel for example, pivoting about a shaft 61 parallel to the axis of the electrode 44.

This roller 60 serves as an abutment against the facing walls of the members 100 and 101 or against a guiding rail (not shown), and its radius determines the distance of the electrode wire to one of these walls or to this rail. It is interchangeable, being one of a variety of sizes, for selective predetermination of this distance.

It should be indicated that the shoe 53 may be replaced by a roller (alternative not shown).

The arm 43 terminates in a point in order to permit the bringing-in close to the electrode of a spout for the introduction or suction of flux, gases or the like, depending on the method of welding utilized. Two introduction and suction spouts 62 and 63 are shown in FIG. 1 on each side of the nozzle according to the invention.

Figure 4:
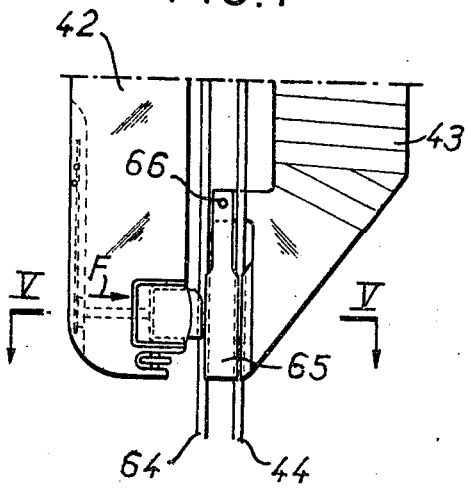
FIG. 4 is a partial view in elevation of an alternative form of the nozzle shown in FIG. 2.
Figure 3:
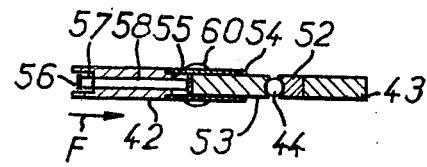
FIG. 3 is a view in slightly enlarged cross-section taken along the line III—III of FIG. 2.
Figure 5:
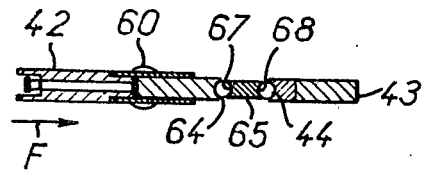
FIG. 5 is a slightly enlarged view in cross-section, taken along the line V—V of FIG. 4.

FIGS. 4 and 5 show an alternative form of the device equipped with two electrode wires 44 and 64. In this case, the arm 43 is provided, facing the contact member 52, with an intermediate conductive member 65 articulated about a horizontal shaft 66. The member 65 has two vertical grooves 67, 68 (see FIG. 5). It becomes housed between the shoe 53 and the member 52, in such manner that the two electrodes are retained in their respective grooves, guided in their forward movement and supplied with welding current.

It will be observed from FIG. 1 that the lower extremity of the arm 43 and also the spouts 62, 63 over their whole height, are protected by an insulating coating (glass wool tape for example, as shown) avoiding the risks of arcing, especially in the position of abutment.

The method of operation of the welding head according to the invention, in either of the alternative forms described (which only constitute examples chosen from numerous other possibilities) brings out clearly the following advantages:

The electrode wire is continuously held at the suitable point in the joint to be welded; for this reason, the inclusions of slag in the submerged arc welds are avoided and the defects of compactness resulting from the bad positioning of the molten metal by submerged arc welding or by welding according to other methods of welding by fusion, are eliminated; the welding of parts of considerable thickness can be effected without risk of defect in the narrowest chamfers; this reduction of the chamfer results in a corresponding economy in the volume of material to be deposited.

Figure 11:
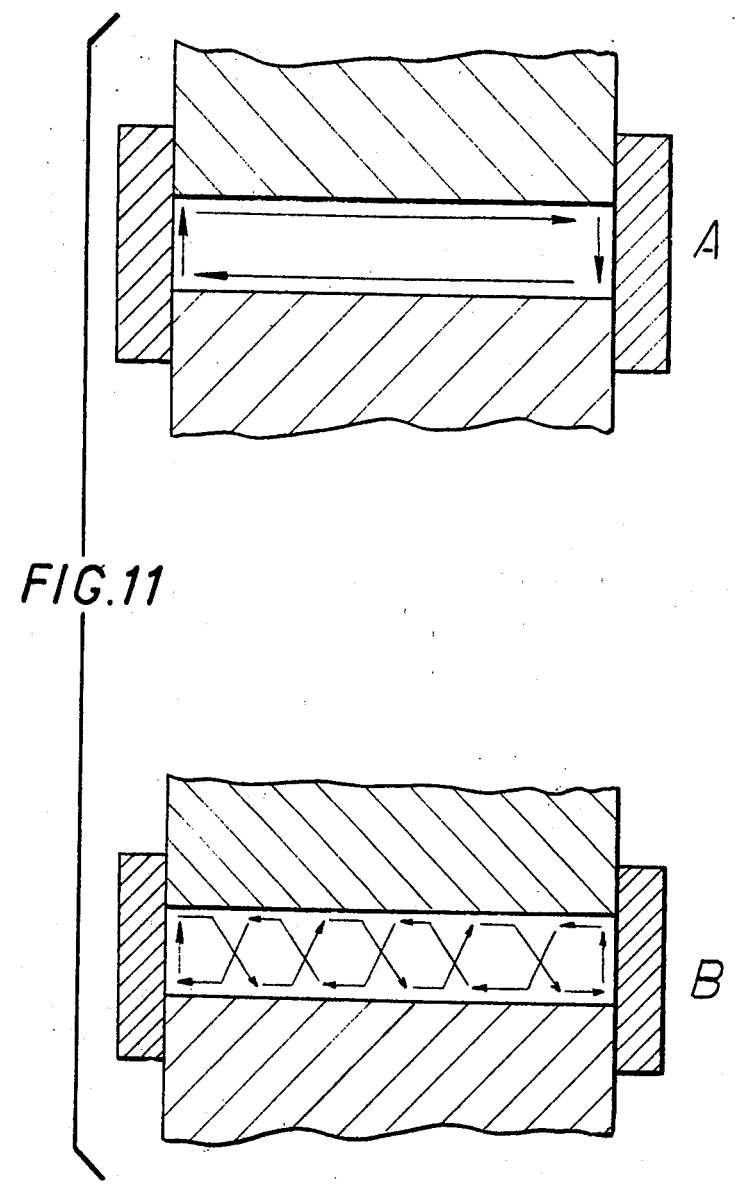
FIG. 11 shows at A and B, two examples of sweeping over a joint, to illustrate the combined action of two oscillation devices according to the invention, acting at 90° from each other; and Finally.

The displacement of the welding nozzle in this latter case in particular or of another apparatus, may be regulated by two similar devices working at 90° with respect to each other in order to carry out a sweep of the type A or B of FIG. 11, which are furthermore not restrictive. By regulating the speeds and the time-delays as permitted by the form described with reference to FIG. 8, an infinite number of combinations of travel is obtained.

Figure 12:
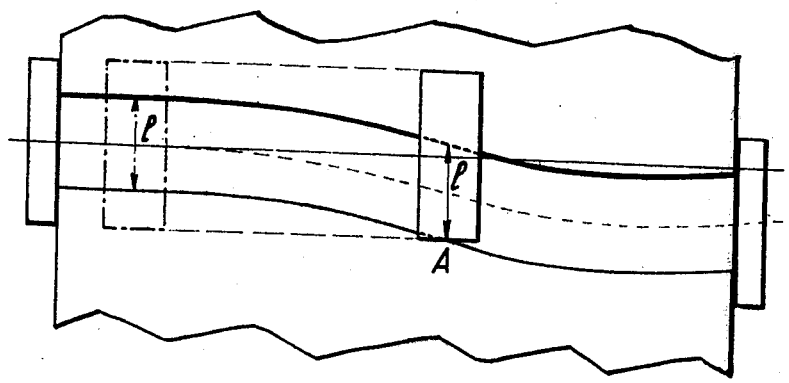
FIG. 12 illustrates the operation of the oscillation device along a joint having a sinuous form.

This same movement may also be effected along a welding joint of sinuous form (see FIG. 12). In fact, the head normally oscillates by translation or pendular movement along a travel 1 between the opposite faces, the reversals of the direction of working being caused by the mechanical contact of the roller 60 against the faces of the joint. If the means longitudinal axis (broken lines) of the joint deviates from the axis of forward movement of the head (full lines), the transverse displacement of the travel 1 can reach a value such that beyond the point A, a suitable extension of the trolley 14 actuates one of the micro-contacts 19, 20 (see FIG. 1). In the case of a pendular oscillation, it would be the means 7, 8 of FIG. 10 which would be actuated. The pneumatic unit thus operated causes the stopping of the trolley 14 and releases a safety-limit alarm or indication, such as a sound and light signal which causes the operator to re-center the trolley with respect to the point of welding.

The welding head with the guiding and oscillation device and the electrode-carrier nozzle according to the invention was initially designed for the improvement of multi-pass submerged arc welding for parts of considerable thickness. Amongst its other fields of application, there may be cited by way of examples, the welding of parts of great thickness following other methods of welding by fusion, the welding of relatively-thin pieces in one or two passes, submerged arc work or generally speaking methods of welding by fusion, strengthening of parts, oxy-hydrogen cutting and machining. The driving fluid actuating the jack may be gaseous or liquid.

the present invention is not of course limited to the form of construction described and shown but includes all alternative forms of execution.

What we claim is:

1. Tool-holding apparatus for the reciprocated coursing of a welding-electrode or the like tool element between lateral limits of the bottom of a channel during the longitudinal progression of the holder along the channel, said apparatus including a tool-supporting element of smaller transverse extent than the channel at the region of holder insertion into the channel, said apparatus comprising a frame with means supporting the tool-holder element for tool-element insertion in the channel and for transversely guided reciprocation between the channel walls, drive means for imparting successive transverse reciprocating displacements to said tool-holder element in opposite directions with respect to said frame, means responsive to tool-supporting-element contact with a channel wall and effective to arrest motion of said drive means upon attainment of each limit of transverse reciprocation, and means operative to establish a predetermined dwell of said electrode-holder element at each arrested limit of transverse reciprocation.

2. Tool-holding apparatus according to claim 1, further comprising guide means for establishing a component of longitudinal displacement of said tool-holder during the transverse-displacement and dwell periods of transverse reciprocation.

3. Tool-holding apparatus according to claim 1, in which said predetermined dwell means comprises a source of pulses of predetermined period exceeding the travel time of said element from one to the opposite end of a single transverse displacement thereof between channel walls, the amount by which said predetermined period exceeds said travel time being selected as said predetermined dwell.

4. Tool-holding apparatus according to claim 3, in which said predetermined dwell means includes manually operated means for initiating each predetermined-period pulse.

5. Tool-holding apparatus according to claim 1, in which said predetermined dwell means includes time-delay means actuated upon conclusion of a transverse displacement of said element near one of the channel walls, said time-delay means being set for said predetermined dwell, and means operated by said time-delay means upon conclusion of the predetermined dwell for initiating the next-succeeding transversely guided reciprocating stroke of said drive means.

6. Tool-holding apparatus according to claim 5, in which said time-delay means is fluid-pressure operated.

7. Tool-holding apparatus according to claim 1, in which said support means comprises a rectilinear guide and slide.

8. Tool-holding apparatus according to claim 1, in which said support means includes a pendulous pivoted connection of said tool-supporting element to said frame.

9. Tool-holding apparatus according to claim 1, in which said drive means includes double-acting fluid-pressure operated means, and means operative upon conclusion of said predetermined dwell for initiating each succeeding stroke of said fluid-pressure operated means.

10. Tool-holding apparatus according to claim 9, in which said tool-supporting element includes abutment means poised for interference with a channel wall upon approach thereto at conclusion of a reciprocating stroke, relief-valve means in the fluid-pressure supply to said double-acting means, said time-delay means being operated upon operation of said relief-valve means.

11. Tool-holding apparatus according to claim 10, in which said time-delay means is fluid-pressure operated by fluid discharged upon operation of said relief-valve means.

12. Tool-holding apparatus according to claim 1, in which said drive means includes means for selectively varying the speed of transverse reciprocation.

13. Tool-holding apparatus according to claim 1, in which said last-defined means includes means for selectively varying the effective time of said predetermined dwell.

14. Tool-holding apparatus according to claim 1, in which said tool-supporting element comprises a continuous-feed electrode carrier for at least one welding electrode.

15. Tool-holding apparatus according to claim 1, in which said tool-supporting element includes an abutment-roller element poised for interference with a channel wall upon approach thereto, said roller element being oriented for rolling contact with the channel wall in the course of a longitudinal displacement of said holder element.

16. Tool-holding apparatus according to claim 15, in which said roller element is of effective diametral extent to transversely project beyond both transverse limits of the tool-supporting element and is thus poised for interference with each channel wall upon approach thereto.

17. Tool-holding apparatus according to claim 1, in which said means supporting the tool-holder element establishes a range of tool-holder element transverse displaceability which exceeds the effective width of channel to be traversed, whereby said drive means may be centered in its traverse displacement of said holder element, within a range of curvilinear deviation of the channel.

18. Tool-holding apparatus according to claim 17, further comprising safety-indicator means responsive to a predetermined deviation.

19. Tool-holding apparatus according to claim 18, in which said safety-indicator means includes limit-switch means and channel-wall abutment means on said supporting means for actuating said limit-switch means.

20. Tool-holding apparatus according to claim 1, in which said tool-supporting element includes first and second longitudinally spaced substantially vertical arms defining therebetween and at the insertion region an upstanding passage for the guided reception of a welding electrode, and means for supplying electrode current to one of said arms.

21. Tool-holding apparatus according to claim 20, in which said tool-supporting element further includes electrically insulating plate means to which said arms are mounted, said plate means having an electrode-guide passage aligned with said upstanding passage.

22. Tool-holding apparatus according to claim 20, in which said one arm includes at the insertion region a vertical groove open toward and coacting with the adjacent part of said other arm to define said upstanding passage.

23. Tool-supporting apparatus according to claim 20, in which said other arm includes a main-body portion and, at the insertion region, a friction shoe of insulating material having movably guided support means in the main body portion; the direction of guided movement being generally transverse to the direction of electrode reception, and resilient means reacting between said body portion and said shoe for resilient loading of an inserted electrode into conductive contact with the adjacent part of said one arm.

24. Tool-supporting apparatus according to claim 23, in which the insertion region of said main-body portion includes an abutment-roller element poised for interference with a channel wall upon approach thereto, said roller element being of electrically insulating material.

25. Tool-supporting apparatus according to claim 20, in which said upstanding passage is one of two longitudinally spaced upstanding passages defined between and at least in part by each of said arms, and an intermediate conductive contact member movably carried by said first arm and including opposed longitudinally outwardly open vertical guide grooves which respectively complete the definition of said upstanding passages, in cooperation with the electrode-passage portions of said arms.

26. Tool-holding apparatus according to claim 20, in which said means supporting the tool-holder element includes means for supplying welding flux at the region of tool-element insertion in the channel.

27. Tool-holding apparatus according to claim 20, in which said arms are at least partially covered with insulation in the region of tool-element insertion in the channel.

28. Tool-holding apparatus according to claim 20, in which said arms are formed, at least in the insertion region, as relatively thin blades oriented so that the faces of the blades extend generally longitudinally and therefore generally parallel to the walls of a workpiece channel to be welded.

29. Tool-holding apparatus for the reciprocated coursing and the guiding of a welding-electrode or the like tool element between lateral limits of a channel during the longitudinal progression of the holder along the channel, said apparatus including a tool-supporting element of smaller transverse extend than the channel at the region of insertion into the channel, said apparatus comprising a frame with means supporting the tool-holder element for tool-element insertion in the channel and for transversely guided reciprocation between the channel walls, said tool-supporting element including abutment means adapted to cooperate with the walls of the channel for providing limits of transverse reciprocation of variable extent limited by the abutment means coming into contact with the walls of said channel, control means for producing a signal in response to abutment-means contact with one of the channel walls, drive means responsive to said signal for imparting successive strokes of transverse reciprocation to said tool-holder element between spaced positions of channel-wall contact by said abutment means, and dwell means operatively connected to said drive means for inhibiting during a predetermined period of dwell the action of said control means on said drive means whereby said tool-holder element remains transiently immobile in its positions of channel-wall contact.

* * * * *